Nov. 24, 1964  C. W. HILL  3,158,730
GAS SHIELDED ARC TORCH

Filed Nov. 8, 1962  5 Sheets-Sheet 1

INVENTOR.
CLIFFORD W. HILL
BY Richard S. Shreve Jr.
ATTORNEY

INVENTOR.
CLIFFORD W. HILL

BY *Richard S. Shreve Jr.*

ATTORNEY

Nov. 24, 1964  C. W. HILL  3,158,730
GAS SHIELDED ARC TORCH

Filed Nov. 8, 1962  5 Sheets-Sheet 3

INVENTOR.
CLIFFORD W. HILL
BY
*Richard S. Shreve*
ATTORNEY

INVENTOR.
CLIFFORD W. HILL
BY Richard S. Shreve Jr
ATTORNEY

United States Patent Office 3,158,730
Patented Nov. 24, 1964

3,158,730
GAS SHIELDED ARC TORCH
Clifford W. Hill, Mountainside, N.J., assignor to Union
Carbide Corporation, a corporation of New York
Filed Nov. 8, 1962, Ser. No. 236,775
3 Claims. (Cl. 219—75)

This invention relates to gas shielded arc torches and, more particularly, to torches of this character capable of independent and universal adjustment of the head with respect to the handle.

This application is in part a continuation of my copending application, Serial No. 103,408, filed April 17, 1961, now abandoned.

Much effort toward an adequate solution of this problem has been attempted; however, it was not until the present invention that a most desirable solution had been found. As a case in point, R. W. Tuthill in U.S. Patent No. 2,555,017 discloses a flexible, nonresilient metal tubing so connected as to supply gas and electricity to the electrode which copper tube is covered with an electrically insulating, heat-resisting, flexible sheath. Unfortunately, after repeated bending the copper tube work hardens, becomes immobile, and breaks.

Another approach by F. M. Simms et al. in U.S. Patent No. 2,943,183 utilizes a series of conduits formed into the shape of a helix. In so doing, these conduits serve the function of gas and water carriers and as the current carrier. It too, however, failed after repeated bending, causing the system to fail. Thereafter, serious internal arcing conditions result with complete inoperativeness of the welding torch.

The main object of this invention is to provide a welding torch having a head capable of universal angular and lateral disposition with respect to the torch handle.

Other objects are to provide a flexing means having a high degree of rigidity after being bent into a preselected configuration, a long flexing life wherein the undesirable effects of work hardening are minimized, an unusually small head and neck wherein welding in hard to reach corners is facilitated, a small, light and uncomplicated torch assembly, and coolant entering and exiting from within the torch handle wherein such coolant effectuates a high degree of heat transfer from the current conduits located within the torch neck.

Figure 1:
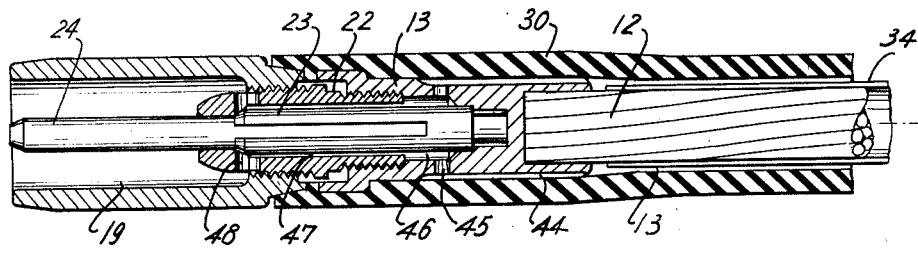
FIGURE 1 is a broken axial section through front, middle, and rear parts of a torch embodying the preferred form of the invention.
Figure 1:
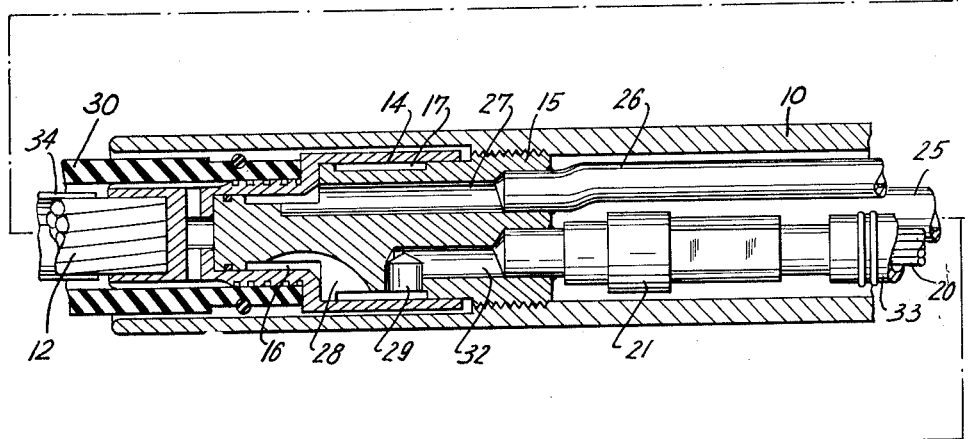
Figure 1:
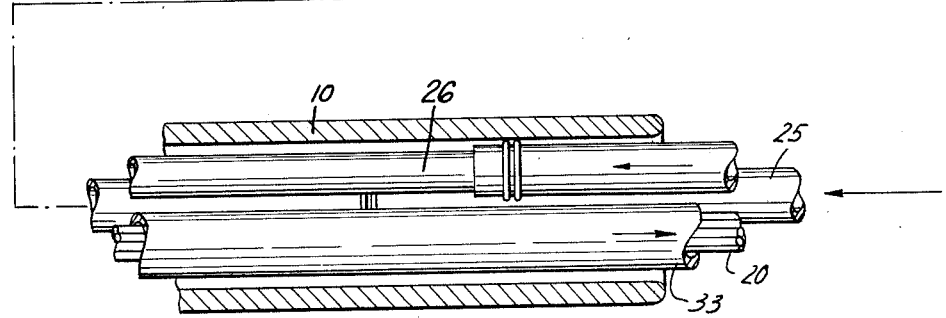

The torch shown in FIG. 1 comprises a handle 10 having an insulated shell and a metallic insert inside thereof comprising a body 15 and a water jacket 14. A bundle of flexible solid metal wires 12 are secured at their rear ends to the front end of the metallic insert, preferably in a socket in the water jacket 14, and extending forwardly therefrom.

An electrode contactor 13 is secured to the forward end of the wires 12, which are preferably received in a socket in the rear end of the contactor. The bundle of wires is preferably contained in a nonconductive envelope 34. In the form shown, the contactor 13 comprises a collet body 22 and a collet 23 for gripping an electrode 24. Electric current is supplied to the metallic insert 15 by conduit 20 and power cable fittings 21, on through the bundle of wires 12 to the contactor 13.

Figure 2:
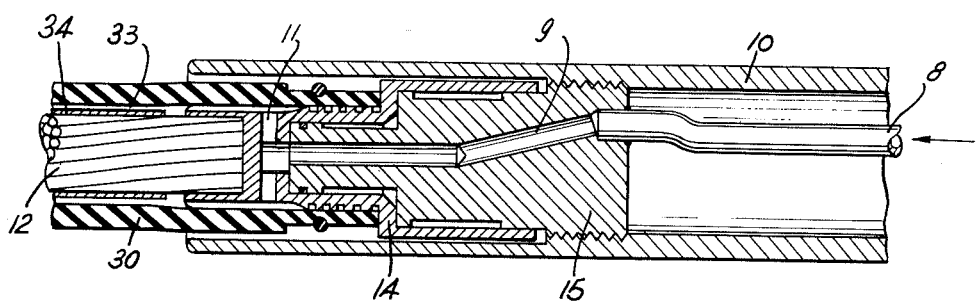
FIGURE 2 is a broken axial section through the handle end of the torch taken at a different angle.

A gas directing nozzle 19 surrounds the electrode 24. In the form shown, the nozzle 19 is screwed onto the collet body 22. An insulator sheath 30 surrounds the wires 12 and extends from the insert 15 on over the wires 12 onto the contactor 13. As shown in FIG. 2, shielding gas enters the tube 8 and passes through drillings 9 in the body 15 and dispersed through four drillings 11 at right angle to each other. The gas passes along through annular passage 33 between the sheath 30 and envelope 34. Four slots 44 in the rear of contactor 13 lead to four drillings 45 from which the gas passes along passages 46 and 47 to radial drillings 48 for discharge inside the nozzle 19.

Figure 3:
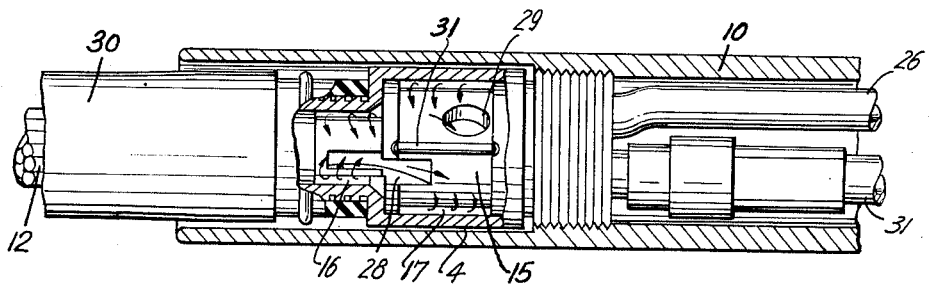
FIGURE 3 is a similar section with internal parts shown in elevation.

Cooling water supplied by hose 25 through metal tube 26 into drilling 27 in the metal body 15 passes to a chamber 16 between the body and the water jacket, where it is divided as shown in FIG. 3, into clockwise and counterclockwise streams shown by the arrows. These streams unite in chamber 16 and exit through chamber 28 into a chamber 17. A baffle 31 directs the flow away from orifice 29 to a circular path around chamber 17 before it exits through orifice 29 into drilling 32 and out through water hose 33 via power cable fittings 21.

Figure 6:
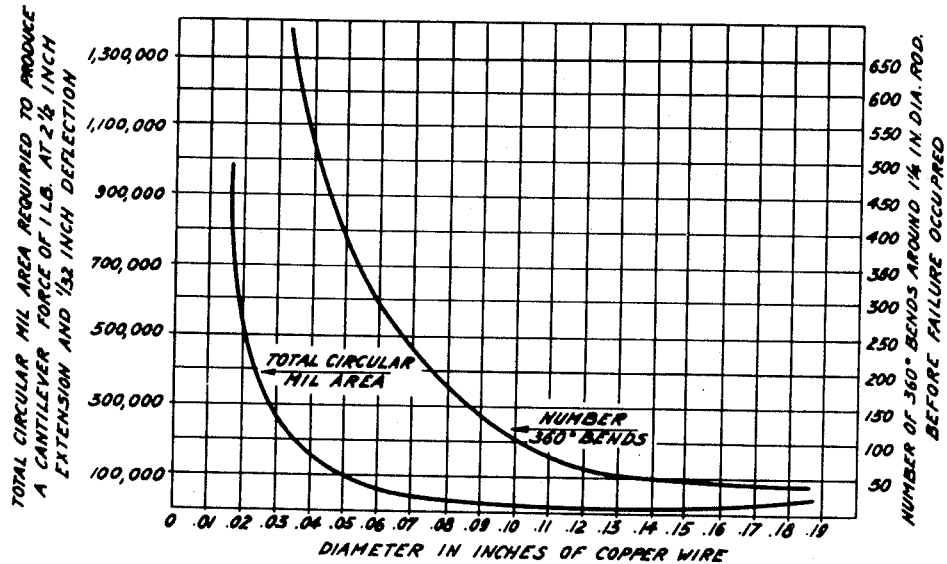
FIGURE 6 is a curve of circular mil areas for the desired density vs. diameter of copper wire, also a curve of the number of bends before failure occurs vis diameter of copper wire.

In order to establish the optimum wire size in relation to the various other factors such as current-carrying capacity, thermal conductivity, and rigidity, tests were performed correlating flex life and wire size. These tests were performed with the preselected wire bent one complete revolution over a 1¼ in. diameter mandrel (approximating the smallest curvature that would generally be applied to general purpose flexible head tungsten inert gas welding torches). The tests were performed on annealed copper wire in view of the general suitability of copper wire for the flexing means. FIGURE 6 indicates the results of these tests.

Figure 5:
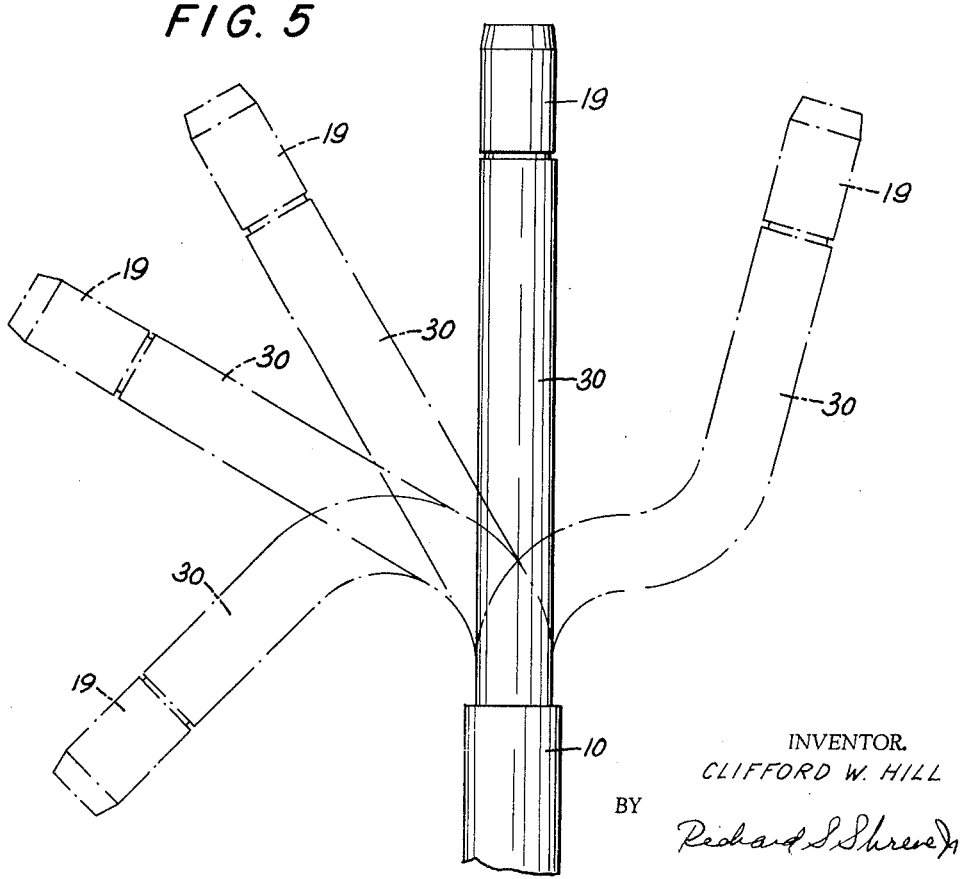
FIGURE 5 is an elevation of the torch showing different flexed positions in dotted lines.

One of the requirements for a good flexing means is to provide sufficient rigidity and prevent objectionable movement of the torch head in relation to the torch handle after the torch head has been placed in a given fixed position as illustrated in FIG. 5.

An idealized but very useful analysis of the relationship between the wire size, number of wires, and rigidity can be made by calculating the force necessary to produce a measured deflection when the wires are mounted as a cantilever. It was experimentally determined that there exists acceptable torch rigidity for most commercial uses, if after a one pound force is directed at right angles to the end of the flexing wires, a deflection of $\frac{1}{32}$ in. is produced. This calculation was made using the following formula:

$$P = \frac{3FEI}{L^3}$$

wherein:

$F$ = deflection in inches. Assume $\frac{1}{32}$ in. as the maximum practical deflection or movement of the head on a general purpose torch.

$L$ = length of lever arm in inches. Assume 2½ in. as the most practical distance for a general purpose torch.

$P$ = load in pounds which is needed to produce the deflection of $\frac{1}{32}$ in.

$E$ = modulus of elasticity. Use 15,600,000 p.s.i. for copper (reference page 398, Marks Handbook, fifth edition).

$I$ = moment of inertia. For round wire, $I = 0.049 \, D^4$ (reference page 361, Machinery's Handbook, fourteenth edition).

Table I illustrates the calculations of the force that is produced when there is a deflection of 1/32 in. at the head end of the torch.

*Table I*

| Total Circular Mil Area (Based Upon Nearest Whole Number of Strands Required to Produce a Cantilever Force of 1 Lb. at the 2½ In. Extension and 1/32 In. Deflection.) | Wire Diameter, In. | $P = \frac{3FEXI}{L^3}$ Lbs. | Number of Strands Required to Produce a Cantilever Force of 1 Lb. at the 2½ In. Extension and 1/32 In. Deflection. |
|---|---|---|---|
| 970,000 | 0.015 | 0.000232 | 4,310 |
| 546,000 | 0.020 | 0.000733 | 1,363 |
| 242,000 | 0.030 | 0.00371 | 269 |
| 63,200 | 0.057 | 0.0483 | 20.7 |
| 61,200 | 0.060 | 0.0594 | 16.8 |
| 24,300 | 0.090 | 0.130 | 3.3 |
| 15,620 | 0.125 | 1.12 | 0.89 |
| 34,970 | 0.1875 | 5.23 | 0.19 |

From these results, the number of wire strands necessary to produce the 1/32 in. deflection (when one pound of force is applied normal to torch head) is calculated. In addition, the total circular mil area of such wires was calculated and is illustrated in FIG. 6.

Annealed copper is the preferred material for the embodiment shown in FIG. 1, as having the desired electrical conductivity, thermal conductivity, and flex life.

For water-cooled welding torches, the high thermal conductivity is advantageous for conducting the heat from the flexing wires to the cooling water circulating through the cooling chambers. On air-cooled torches, it frequently is advantageous to have the flexing wires (current carrier) with a low thermal conductivity of a material such as steel, since less heat would be conducted from the arcing end of the torch handle.

Passable performance of flexible gas shielded arc torches can be obtained using a wide range of wire sizes, number of wires, circular mil area, overall diameter of the bundle, and length of wires. For a 200 ampere torch, passable performance for many applications could be obtained using about seven to fifty wires. For a 75 ampere torch with a total area of about 15,000 circular mils, passable performance for many uses can be obtained using about two to nineteen wires. For a 300 ampere torch with about 130,000 circular mils, passable performance for many uses can be obtained using about nineteen to eighty wires.

As shown in FIG. 6 and the calculated results in Table I, for wire sizes below 0.030 in. there is a rapid increase in circular mil area needed to provide the desired rigidity. The 0.030 in. wire size requires approximately 260,000 circular mils to produce the desired rigidity and due to the advantages of small weight and size, it would not be too practical for most uses to construct an air-cooled torch with a greater circular mil area. The minimum wire size is therefore established at about 0.030 in.

Assuming that it is desirable to establish a maximum wire size, that could be done by referring to FIG. 6. This curve shows about 295, 360 deg. bends at 0.060 in. wire size and 135 bends at 0.090 in. wire size. While about 300 bends would satisfy most commercial uses, a significant number of uses with about 135 bends would be acceptable, thus establishing the maximum wire size at about 0.090 in.

Figure 7:
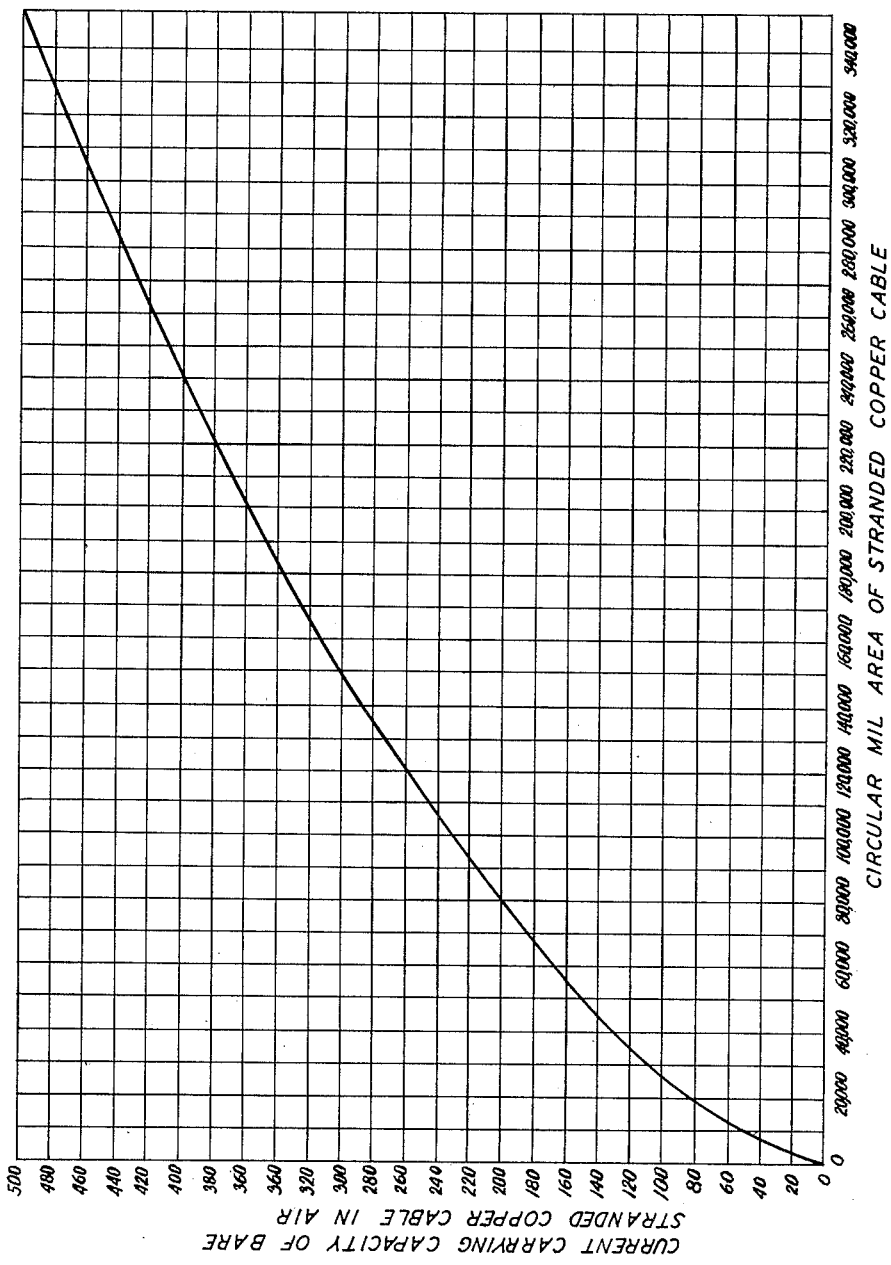
FIGURE 7 is a curve of current-carrying capacity against circular mil area.

There is not too much commercial application for torches having less than 50 amperes current capacity or more than 500 amperes current capacity. Referring to FIG. 7, this establishes the corresponding minimum area for the flexing wires at about 9000 circular mils and the maximum area for the flexing wires at about 350,000 circular mils.

Using probable numbers of wires and wire sizes, the overall bundle diameter for the 9000 circular mil flexing wires is about 0.11 in. and the overall bundle diameter for the 350,000 circular mil flexing wires is about 0.67 in.

The following procedure was utilized in selecting the most practical and efficient diameter and number of wires for the flexing means:

Since a practical flex life was sought after, it was found that a torch capable of withstanding at least 300 bends would satisfy most commercial demands. In most instances, the welding torch as used in commercial practice will be bent to one position and it is not usually necessary to make frequent nor substantial changes in the position of the head.

Based upon FIG. 6, it is necessary to use approximately 0.060 in. diameter or smaller copper wire in order to obtain the desired flex life. From the information in Table I, it is shown that 17 strands of 0.060 in. wire would provide sufficient rigidity. Also, such wire results in a total area of 61,200 circular mils.

FIGURE 7 illustrates that bare stranded copper cable in air with 61,200 circular mils has a current carrying capacity of about 170 amperes. However, with the highly efficient water-cooling system in the present invention, together with the cooling effect of the shielding gas as it passes over the wires, it was calculated that the 61,200 circular mils would permit operation at levels as high as 225 amperes without overheating.

Due to geometric considerations, 19 wires are more efficient than 17 wires for stranding purposes. Therefore, in order to provide about the same circular mil area and approximately the same rigidity as with the 17 strand flexing means, 19 strands of 0.057 in. diameter copper wire were selected to provide sufficient current carrying capacity. A further consideration involved torch utility, i.e. small and lightweight. The 19 strands of 0.057 in. wire resulted in an overall diameter of the stranded wires of 0.285 in. The 0.285 in. diameter is small enough so that the outside diameter of an insulator sleeve enclosing the flexing wires is smaller than the outside diameter of an insulator sleeve over the front body. In other words, the 0.285 in. diameter does not necessitate any increase in the size of the torch that would affect accessibility for welding in confined locations.

Tests performed on a bundle of straight copper wires indicated a slight increase in flex life as compared to similar treatment of individual wires. This difference is apparently due to the increase average radius of curvature of the bundle of wires. Additional tests performed on groups of wires having a slight wind indicated a further increase (slight) in flex life; apparently due to slightly reduced stresses in the wires. The wires that had a slight wind also had an additional advantage of not spreading after repeated bending as compared with the bundle of straight wires. The bundle arrangement of wires, having a slight wind of less than 45 degrees, was therefore selected for the preferred embodiment as is shown in FIG. 1.

As illustrated in Table I and FIG. 6, equivalent rigidity and increased flex life could also be obtained by using increased numbers of smaller wires. However, the total circular mil area would increase substantially when using the smaller wires. This necessarily would result in a larger size torch and increased weight, thereby substantially decreasing the utility of the torch. It would also result in increased costs due to the extra amounts of material utilized and the increased cost per pound of the smaller wires. Nevertheless, for some applications such as in some mechanized operations, these disadvantages would be more than offset by the increased flex life when using the larger number of smaller wires.

Figure 4:
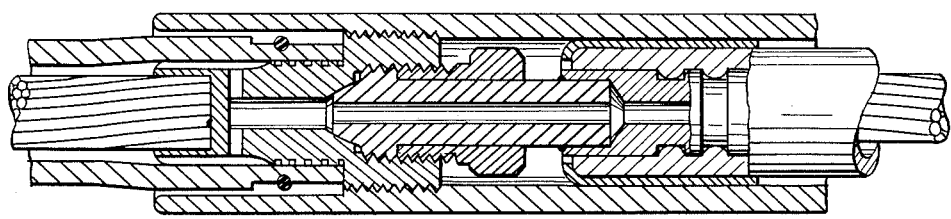
FIGURE 4 is a similar view showing a non-water-cooled modification.

When selecting the wire size and number of wires for the non-water-cooled torch, as shown on FIG. 4, essentially the preceding considerations, as discussed for the water-cooled torch, would also be followed. The only significant difference would be the lack of cooling water.

This results in the torch operating at lower currents for the same circular mil area. The current carrying capacity of the flexing wires would approximate the trace shown in FIG. 7 which is based upon bare stranded cable in air. Some cooling of the flexing wires would take place due to the shielding gas flowing over the wires and thus absorbing a portion of the heat dissipated.

A key factor concerning the successful design of the water-cooled torch is the location of the water-cooling chambers at or near the handle as shown in FIG. 1.

In the inventive system, the coolant proceeds only up the forward end of the handle and thereafter returns out of the torch. This permits the smaller than usual cross-section of the neck and head of the welding torch. Essentially, as water enters the torch it proceeds into an inner chamber and the stream is divided into two segments. Subsequently, the streams meet at a point 180 degrees away from their point of entry and then unite. The stream is next channeled into an outer chamber in which a baffle suitably located prevents direct flow from the inlet of the chamber to the outlet in order to insure adequate cooling of the entire periphery of the chamber. After the stream exits from the outer chamber, it is channeled out of the welding torch.

What is claimed is:

1. Gas shielded arc torch comprising a handle having an insulated shell and a metallic insert inside said shell, a bundle of flexible solid metal wires having their rear ends secured to the front end of said metallic insert and extending longitudinally forward therefrom, an electrode contactor secured to the forward end of said wires, means for supplying electric current to said metallic insert on through said wires to an electrode in said contactor, a gas directing nozzle surrounding said electrode, and a flexible insulating sheath surrounding said wires and forming an annular gas passage therebetween extending from said handle to said nozzle, said wires being sized in diameter from 0.030 in. minimum to 0.090 in. maximum, and numbered to produce a total cross-sectional metal area of from 9,000 to 350,000 circular mils for an overall diameter of the bundle of from 0.11 to 0.67 in.

2. Gas shielded arc torch as claimed in claim 1, in which said wires are of high thermal conductivity, and water-cooling thereof is provided solely by a jacket formed in said metal insert inside said handle shell adjacent the rear end of said wires remote from said contactor, electrode and nozzle, and spaced therefrom by the length of said wires.

3. Gas shielded arc torch as claimed in claim 1 in which said bundle of wires has a wind therein of less than 45 degrees.

References Cited in the file of this patent

UNITED STATES PATENTS

| | | |
|---|---|---|
| 2,555,017 | Tuthill | May 29, 1951 |
| 2,943,183 | Simms | June 28, 1960 |
| 2,999,147 | Nelken | Sept. 5, 1961 |